(12) United States Patent
Junod

(10) Patent No.: US 7,831,045 B2
(45) Date of Patent: Nov. 9, 2010

(54) SECURITY MODULE REVOCATION METHOD USED FOR SECURING BROADCASTED MESSAGES

(75) Inventor: Pascal M. Junod, Vufflens-la-Ville (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 768 days.

(21) Appl. No.: 11/882,504

(22) Filed: Aug. 2, 2007

(65) Prior Publication Data

US 2008/0044019 A1 Feb. 21, 2008

(30) Foreign Application Priority Data

Aug. 17, 2006 (EP) .................................. 06119127

(51) Int. Cl.
*H04N 7/167* (2006.01)
*H04L 9/00* (2006.01)
*H04L 9/08* (2006.01)
*H04L 9/32* (2006.01)

(52) U.S. Cl. ........................ 380/228; 380/239; 380/259; 380/282; 713/171

(58) Field of Classification Search ................. 380/228, 380/239, 259, 282; 713/171
See application file for complete search history.

(56) References Cited

U.S. PATENT DOCUMENTS

2002/0133701 A1 9/2002 Lotspiech et al.

(Continued)

FOREIGN PATENT DOCUMENTS

CN 1554163 12/2004

(Continued)

OTHER PUBLICATIONS

Boneh D et al: "An Efficient Public Key Traitor Tracing Scheme" Advences in Cryptology. Crypto '99. 19th Annual International Cryptology Conference. Santa Barbara, CA, Aug. 15-19, 1999. Proceedings, Lecture Notes in Computer Science; vol. 1666, Berlin: Springer, DE, Aug. 15, 1999, pp. 338-353, XP001194953 Isbn:3-540-66347-9.

(Continued)

*Primary Examiner*—Nasser Moazzami
*Assistant Examiner*—Mohammad W Reza
(74) *Attorney, Agent, or Firm*—Harness, Dickey & Pierce, P.L.C.

(57) ABSTRACT

The aim of the present invention is to propose a method to prevent the abusive use of conditional access data, in particular by means of clones of security modules whose security has been compromised.

This aim is reached by a revocation method of security modules intended to receive security messages broadcasted to a plurality of security modules, said security modules comprising at least one personal key, this method comprising the steps, prior to revocation:
  division of the set of security modules into at least two groups,
  determination for each group of an asymmetrical key comprising a public key and a plurality of private keys,
  loading of one private key per security module,
  transmission of one security message per group, said message being encrypted by the public key of said group;
revocation consisting in the following steps:
  sending to each member of the same group as the security module to be revoked, with the exception of the security module(s) to be revoked, of a new private key corresponding to the public key of another group, each private key being encrypted by the personal key of said security module.

6 Claims, 1 Drawing Sheet

| KGrA | KGrB | KGrC | KGrD | KGrE |
|------|------|------|------|------|
| SC1A | SC1B | SC1C | SC1D | SC1E |
| SC2A | SC2B | SC2C | SC2D | SC2E |
| SC3A | SC3B | SC3C | SC3D | SC3E |

U.S. PATENT DOCUMENTS

2004/0114762 A1 6/2004 Medvinsky
2004/0120529 A1 6/2004 Zhang et al.

FOREIGN PATENT DOCUMENTS

| EP | 1 501 237 | 1/2005 |
|----|-----------|--------|
| GB | 2419262 A | 4/2006 |
| WO | WO 01/56287 A2 | 8/2001 |

OTHER PUBLICATIONS

Halevy D et al: "The LSD Broadcast Encryption Scheme" Lecture Notes in Computer Science, Springer Verlag, Berlin, DE, vol. 2442, 2002, pp. 47-60, XP002279256 ISSN: 0302-9743.

Naor D et al: "Revocation and Tracing Schemes for Stateless Receivers" Internet Citation, [Online] Jul. 2001, XP002203174 Extrait de l'Internet: URL:http://eprint.iacr.org/2001/059.pdf> [extrait le Jul. 24, 2002].

| KGrA | KGrB | KGrC | KGrD | KGrE |
|------|------|------|------|------|
| SC1A | SC1B | SC1C | SC1D | SC1E |
| SC2A | SC2B | SC2C | SC2D | SC2E |
| SC3A | SC3B | SC3C | SC3D | SC3E |

| KGrA | KGrB | KGrC | KGrD | KGrE |
|------|------|------|------|------|
| SC1A | SC1B | SC1C | SC1D | SC1E |
|      | SC2B | SC2C | SC2D | SC2E |
|      | SC3B | SC3C | SC3D | SC3E |
|      | SC2A |      | SC3A |      |

SECURITY MODULE REVOCATION METHOD USED FOR SECURING BROADCASTED MESSAGES

INTRODUCTION

The present invention relates to the field of the security of security modules, these modules being intended to contain personal data and secrets that allow access to services or performances.

This invention applies more precisely to the Pay-TV field, in which a content is broadcasted in the enciphered form, the deciphering of this content being authorized in determined conditions.

STATE OF THE ART

In a well-known way, in order to be able to view a Pay-TV event, such as a film, a sports event or a game in particular, several streams are broadcasted to a multimedia unit, for example, a decoder. In particular, on one hand these streams is the file of the event in the form of an enciphered data stream and on the other hand is a stream of control messages allowing the deciphering of the data stream. The content of the data stream is enciphered by "control words" (Control words=cw) that are regularly renewed. The second stream is called the ECM stream (Entitlement Control Message) and can be formed in two different ways. According to a first method, the control words are enciphered by a key, called a transmission key TK, which generally pertains to the transmission system between the management centre and a security module associated with the receiver/decoder. The control word is obtained by deciphering the control messages by means of the transmission key TK.

According to a second method, the ECM stream does not directly contain the enciphered control words, but rather contains information allowing the control words to be determined. This determination of the control words can be carried out by means of different operations, in particular by decryption, this decryption can lead directly to the control word, which corresponds to the first method described above, but the decryption can also lead to an item of data which contains the control word, which must then be extracted from the piece of data. In particular, the data can contain the control word as well as a value associated with the content to be broadcasted, and in particular the access conditions to this content. Another operation allowing the determination of the control word can use, for example, a one-way hashing function of this information in particular.

In a way well known to those skilled in the art, the security module can essentially be produced according to four different forms. One of these is a microprocessor card, a smart card, or more generally an electronic module (taking the form of a key, a badge, . . . ). This type of module is generally removable and can be connected to the decoder. The form with electric contacts is the most widely used, but a connection without contacts is not excluded, for example of the ISO 14443 type.

A second known form is that of an integrated circuit shell placed, generally in an irremovable and definitive way, in the decoder shell. One variant is made up of a circuit mounted on a base or a connector such as an SIM module connector.

In a third form, the security module is integrated into an integrated circuit shell also having another function, for example in a descrambling module of the decoder or the microprocessor of the decoder.

In a fourth embodiment, the security module does not take a material form, but rather its function is only implemented in the form of software. Given that in the four cases, although the security level differs, the function is identical, it concerns a security module regardless of the way in which it carries out its function or the form that this module may take.

At the time of the deciphering of a control message (ECM), it is verified, in the security module, that the right to access the content in question is present. This right can be managed by authorization messages (EMM=Entitlement Management Message) that load such a right into the security module.

The broadcasting of conditional access digital data is schematically divided into three modules. The first module is responsible for the enciphering of the digital data by control words cw and the broadcasting of this data.

The second module prepares the control messages ECM containing the control words cw, as well as the access conditions and broadcasts them for the users.

The third module prepares and transmits the authorization messages EMM that are responsible for defining the reception rights in the security modules connected to the receivers.

While the first two modules are generally independent of the recipients, the third module manages the set of users and broadcasts data for a user, a group of users or all the users.

One of the methods for bypassing security, which is certainly difficult but feasible, consists in analyzing the content of an authorized security module (reverse engineering) in order to imitate the security part (deciphering of the messages) by short-circuiting the verification part of the rights. It is thus possible to produce a "clone" of a genuine security module. Such a clone will therefore dispose of the transmission key that will allow the deciphering of the control words cw contained in the control messages ECM. As the rights are not verified in this clone, it will function as the original with respect to the deciphering means without therefore needing to dispose of the rights to carry out this deciphering.

In a Pay-TV system, it is possible to change the transmission key. For this, in principle two methods can be used. The first consists in broadcasting the new transmission key to all decoders. The latter can then be updated so that as soon as the new key is used, they can decode the events. This type of update does not allow the exclusion of a cloned decoder since it can also receive the update messages since it disposes of the relevant deciphering keys.

Given that each security module includes at least one unique key, the second approach consists in transmitting the new transmission key in a message encrypted by this unique key. In this case, the number of messages is at least equal to the number of security modules installed in order to renew this transmission key individually. It is known that if a module is disabled, (that is to say if the host apparatus is not supplied), it will not receive such a message and can no longer offer to the user the services to which s/he would have a legitimate right when the host apparatus is powered on. In order to avoid this situation, during the sending of a message to a module, this message is repeated many times in order to be sure that it has been received correctly by its recipient.

Due to the limited bandwidth available and in order to ensure that each subscriber has received the new key, it is necessary to transmit the message before this new key is used, for example one month in advance, each message being repeated at different time during the day.

Henceforth, the owner of a clone module will request the new transmission key from the technician who has provided him/her with such a clone and who disposes of means for extracting the new transmission key from an authentic module. Once the key has been supplied, for example on the Internet, all the clones can then be updated before the new key is activated. In this way, the clones always remain operational.

As a result, the sending of transmission keys both by global or individual transmission presents drawbacks that do not allow the elimination of a cloned module.

BRIEF DESCRIPTION OF THE INVENTION

Therefore, the aim of the present invention is to propose a method to prevent the abusive use of conditional access data, in particular by means of clones of security modules whose security has been compromised.

This aim is achieved by means of a revocation method of security modules intended to receive security messages broadcasted to a plurality of security modules, said security modules comprising at least one personal key, this method comprising the steps, prior to revocation:

- division of the set of security modules into at least two groups,
- determination for each group of an asymmetrical key comprising a public key and a plurality of different private keys,
- loading of one private key per security module,
- preparing, in view of broadcasting, of one security message per group, said message being encrypted by the public key of said group;
- revocation consisting of the following steps:
- sending to each member of the same group for which the security module is to be revoked, with the exception of the security module(s) to be revoked, of a new private key corresponding to the public key of another group, each private key being encrypted by the personal key of said security module.

An example of the generation of group asymmetric keys uses the Boneh-Franklin system (Dan Boneh, Matthew K. Franklin: An Efficient Public Key Traitor Tracing Scheme. CRYPTO 1999: 338-353). From a public key, it is possible to generate a plurality of private keys, each allowing the decryption of a message encrypted by the public key.

This allows a different key to be placed in each security module by sending a limited number of different messages.

BRIEF DESCRIPTION OF THE DRAWINGS

The invention will be better understood thanks to the following detailed description that refers to the enclosed drawings that are given as a non-limitative example, in which.

DETAILED DESCRIPTION

Figures 1, 2, 3:
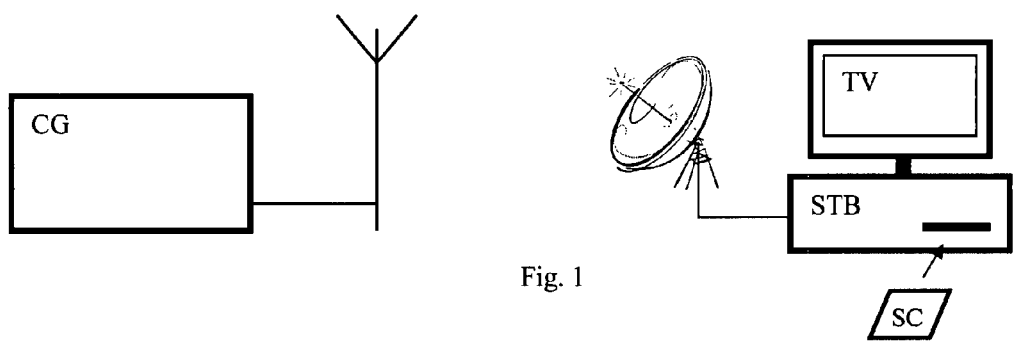
FIG. 1 schematically shows a transmitter and a Pay-TV receiver.
FIG. 2 shows the distribution into 4 groups each comprising 3 security modules.
FIG. 3 shows the distribution of the groups after the revocation of a security module.

In the field of the broadcasting of security messages, prepared and sent from a management centre CG to a plurality of STB multimedia units, we are faced with a trade-off between the global addressing, i.e. the same message for all the units, and the individual addressing, i.e. a message for each unit.

In the first case, the system is fast because only one message allows, for example, the transmission key to be changed. This is the key that encrypts the messages containing the control words cw.

It is possible to imagine the consequences of the second case as it must regularly transmit information to each security module.

This is why the solution according to the invention is to divide the set of security modules into groups, each group being able to contain several hundreds of modules. According to one variant, each group includes 256 members. Therefore, 1 million subscribers represent approx. 4000 groups, thus 4000 messages to renew the transmission key or to update a security program.

The management centre CG sends the security messages to the multimedia units STB. These units STB comprise security means SC, illustrated in FIG. 1 by a plug-in smart card.

At the time of the personalisation of such a security module, the secrets keys pertaining to each module are loaded. Each security module carries an identification number UA that will allow the secrets keys introduced into a module to be traced.

The management centre CG disposes of a database with the list of personal keys for each security module.

The management of modules into groups can be carried out either during the personalisation of the module (in general before delivery) or on site during start-up. According to our invention, a key or a piece of information is necessary to access services controlled by the management centre. This can be an independent and supplementary step to the management of the rights. The fact that the key or the information is accessible to all the security modules does not mean that the services are accessible to subscribers disposing of these security modules.

As previously indicated, a security module is assigned to a group, for example the group GrA. This assignation can be made either at the time of the initialization of the module, or by sending the personal private key corresponding to the group GrA. The sending of this key is protected by the encryption of said key by one of the personal keys of the security module. According to the example in FIG. 2, the security modules SC1A, SC2A and SC3A are part of this group GrA. The secret information is encrypted by the key KGrA in the management centre CG and deciphered by each private key of the security modules.

In the same way, other groups GrB, GrC or GrD also comprise security modules SC . . . B, SC . . . C or SC . . . D.

Therefore, the set of security modules receives the secret information necessary for the correct working of the conditional access system by sending as many different messages as there are groups. It is to be noted that the repetition of the messages is not avoided in the case where the set-top-box have no return channel. The management center will repeat the messages according to a predefined schedule, e.g. one per day at different time randomly selected.

At the time of the detection of a security module clone, for example, if such a module has been compromised by the extraction of the keys, the personal private key will be found in all the clones.

Once a clone is known, it is possible to determine which is the security module that has been compromised by comparing the private key of this clone module with the private keys stored in the management centre. The management centre keeps a copy of the private key loaded into each security module. According to our example, the module to be revoked is the module SC1A. The group GrA will thus disappear as it is no longer possible to send secret messages encrypted by means of the public key KGrA. Before stopping the sending of the messages encrypted by the group key KGrA, all the security modules, with the exception of corrupted security module, must change group.

In the example in FIG. 3, the security module SC2A is moved into group B, the module SC2A is moved to group D. This operation is carried out by sending the group key of its new membership. This group key is encrypted by a personal key of the security module so that this message can only be interpreted by the security module concerned. Once the uncorrupted members have been removed from the compromised group, the sending of messages with group key A is interrupted. At this moment, all the clones cease to be operational as they can no longer receive the secret information.

The moving of the members not revoked towards other groups can be carried out either towards other existing groups, or by the creation of a new group.

The membership to a group is carried out as indicated by the presence of a unique private key generated in a asymmetric system with a public key and a plurality of private keys. According to another embodiment, a group identifier is also transmitted so as to filter the messages pertaining to this group from other groups. The secret information are encrypted by the public key of said group, and the group identifier is added to said message. This allows to decrypt a message and to realize that the content of same is random, due to the use of the wrong key. The group identifier is preferably tested by the host apparatus which has received this identifier from the security module. A security message is transmitted to the security module only if it contains the same identifier of the security module.

The secret information can take several forms. The document WO0156287 describes a method to combine information in order to obtain the control word. The secret information could either be the master control word that will be combined with the control words CW contained in the control messages, or the key for decrypting a message containing the master control word.

Another form of secret information has the form of a transmission key. This key is used for decrypting the control messages ECM and extracting the control words. This transmission key is changed every month, for example.

In practice, for example during a transmission key change, the sending of the new key to all the security modules can take time. The security modules will thus dispose of two pieces of secret information, one current and another ready to take over. In the case of the transmission key, the header of the control message will contain an indication to show which is the transmission key to be used. A simple system is to define an even transmission key and an odd transmission key. The control message ECM will contain a bit to define parity and thus the key to be used.

In order to avoid giving ill-intentioned third parties time to find the secret piece of information, provision is made according to one variant of the invention to encrypt the secret piece of information by means of a release key. This key is global and is used regardless of the group of the security module. Therefore each security module will receive a message encrypted by the key of its group and encrypted by a global key. It is also possible to send a release message with the release key encrypted by the global key and additionally encrypted by the group key.

Shortly before the activation of the secret piece of information, for example the transmission key, the management centre CG sends a message containing the global key, encrypted according one of the embodiment described above.

At this moment, each module will be capable of disposing of the secret piece of information thus allowing it to process the corresponding security data.

The invention claimed is:

1. Revocation method of security modules intended to receive security messages broadcasted to a plurality of security modules, said security module comprising at least one personal key, this method comprising the steps, prior to revocation:
   division of the set of security module into at least two groups,
   determination of an asymmetrical key for each group comprising a public key and a plurality of different private keys,
   loading of one private key per security module,
   transmission of one security message per group, said message being encrypted by the public key of said group;
   revocation consisting in the following steps:
   sending to each member of the same group as the security module to be revoked, with the exception of the security module(s) to be revoked, of a new private key corresponding to the public key of another group, each private key being encrypted by the personal key of said security module in which the security modules contain a common key, wherein the content of the security message is over-encrypted by a release key, said release key is encrypted by the common key of the security modules and is transmitted shortly before the activation of the content of the security message.

2. Revocation method according to claim 1 used in a Pay-TV system in which the audio/video data stream is encrypted by control-words (CW), the latter being transmitted in control messages (ECM), said messages being encrypted by a transmission key, wherein the security message contains the transmission key necessary for the deciphering of the control messages (ECM).

3. Revocation method according to claim 1 used in a Pay-TV system in which the audio/video data stream is encrypted by control-words (CW), the latter being transmitted in control messages (ECM), said messages being encrypted by a transmission key, wherein the security message contains a master encryption key of the control-words (CW).

4. Revocation method according to claim 1, wherein the security message contains updates of the software of said security module.

5. Revocation method according to claim 1, wherein the members of a revoked group are reassigned to different existing groups, with the exception of the security module(s) to be revoked.

6. Revocation method according to claim 1, wherein the members of a revoked group are reassigned to a new group, with the exception of the security module(s) to be revoked.

* * * * *